(12) United States Patent
Hickman et al.

(10) Patent No.: US 7,831,834 B2
(45) Date of Patent: Nov. 9, 2010

(54) ASSOCIATING A POSTMARK WITH A MESSAGE TO INDICATE TRUST

(75) Inventors: Kenneth Truman Hickman, San Carlos, CA (US); Joshua Samuel Ramirez, San Jose, CA (US); Miles Augustus Libbey, IV, Mountain View, CA (US)

(73) Assignee: Yahoo! Inc, Sunnyvale, CA (US)

( * ) Notice: Subject to any disclaimer, the term of this patent is extended or adjusted under 35 U.S.C. 154(b) by 1128 days.

(21) Appl. No.: 11/080,734

(22) Filed: Mar. 14, 2005

(65) Prior Publication Data
US 2006/0206713 A1  Sep. 14, 2006

(51) Int. Cl.
*H04L 9/00* (2006.01)
(52) U.S. Cl. .......................... 713/176; 713/168; 726/3; 726/22; 709/206
(58) Field of Classification Search ................. 713/168, 713/176, 166; 726/3, 22; 709/206
See application file for complete search history.

(56) References Cited

U.S. PATENT DOCUMENTS

| | | | |
|---|---|---|---|
| 7,023,968 B1 * | 4/2006 | Silvester .................. 379/88.13 |
| 7,298,378 B1 * | 11/2007 | Hagenbuch et al. ......... 345/589 |
| 2002/0123368 A1 * | 9/2002 | Yamadera et al. ........... 455/556 |
| 2003/0172292 A1 * | 9/2003 | Judge .......................... 713/200 |
| 2004/0015554 A1 * | 1/2004 | Wilson ........................ 709/206 |
| 2004/0058673 A1 * | 3/2004 | Irlam et al. ............... 455/412.1 |
| 2004/0135807 A1 * | 7/2004 | Pickering et al. ............ 345/760 |
| 2005/0039004 A1 * | 2/2005 | Adams et al. ................ 713/166 |
| 2005/0246420 A1 * | 11/2005 | Little, II ..................... 709/204 |
| 2006/0168018 A1 * | 7/2006 | Levin et al. .................. 709/206 |
| 2008/0129757 A1 * | 6/2008 | Tanaka et al. ................ 345/660 |

* cited by examiner

*Primary Examiner*—Benjamin E Lanier
*Assistant Examiner*—Hadi Armouche
(74) *Attorney, Agent, or Firm*—Frommer Lawrence & Haug LLP; John W. Branch (57) ABSTRACT

A method and system directed to the communication of the trust characteristics of electronic messages using visual and audio postmarks. The postmarks may represent a particular trust level on a continuum that can range from suspicious to trusted. A message system may determine the baseline trust level of a message and assign a postmark to the message. The postmark can communicate the trust level of the message to a user without requiring the message to be opened or read. In one embodiment of the invention the user can create rules and filters to classify messages by trust level.

24 Claims, 10 Drawing Sheets

| Name | Address | Trust Level And Custom Postmarks | | |
|---|---|---|---|---|
| Ken Hickman | ken@yahoo.com | Trusted | 😊 | Movie Theme |
| Mom | dmm@yahoo.com | Trusted | 😊 | Spiritual Hymnal |
| John | jdeo@jdoe.kr | General | 😐 | Doorbell Sound |

FIG. 9

| Name | Address | Trust Level And Promotion/Sponsor PMs | | |
|---|---|---|---|---|
| XYZ Corp. | sales@xyzcorp.com | Verified | ♣ | Irish Song |
| ABC Corp. | sales@abccorp.com | Verified | ☀ | Custom Jingle |
| XYZ Corp. | holidaysales@xyz.com | Verified | 🎄 | Christmas Song |

ASSOCIATING A POSTMARK WITH A MESSAGE TO INDICATE TRUST

FIELD OF THE INVENTION

The present invention relates generally to managing electronic messages and more particularly, but not exclusively, managing messages based on a postmark that represents a determined trust level.

BACKGROUND OF THE INVENTION

Electronic messaging is an important tool that allows persons and organizations to communicate rapidly and reliably. There are many forms of electronic messaging including email, instant messaging, and SMS text messaging, all of these methods are becoming more and more prevalent in business and personal communications.

Users typically utilize various tools and systems to help manage their electronic messages. Many of these tools are designed to organize electronic messages based on at least one of, the sender and contents. Typically these message management tools have at least the ability for users to setup personalized rules that can be applied to individual senders. Similarly personalized rules can be configured to apply to all incoming messages from a particular source, or domain. When applied, these rules can at least route incoming messages to particular repositories or folders. Users can also employ programs that apply heuristic algorithms to analyze the subject and content of electronic messages to identify undesirable messages that should be marked as such, or blocked.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the invention is directed to enabling a user of an electronic messaging system to manage and classify the trustworthiness of a received message based on a postmark that indicates at least one determined trust characteristic for the received message. The inventive postmark typically displays a visual representation of a trust level along with the received message. At a glance, a user can quickly determine the amount of "risk" associated with opening the received message based at least in part on a visual representation provided by the postmark. The inventive postmark enables a user to quickly review the trustworthiness of received messages without having to open a potentially unsafe/untrusted message. Generally, the postmark is affixed to the received message without user intervention by a relatively automated process. Also, the visual representations of trust levels can include, but are not limited to, graphics, pictures, images, colors, text, symbols, animations, cartoons, movies, clips, and the like.

Additionally, the inventive postmark can provide an audio representation of a trust level based on at least one sound either singly or in combination with a visual representation of the trust level. The audio representations of the trust levels can include, but are not limited to, voices, songs, music, singing, spoken word(s), tones, signals, noises, atmospheric sounds, and the like. The playing of audio postmarks enables both visually impaired users and those users that are not facing a display to benefit from the invention.

At least one embodiment of the postmark can be localized to a particular user or group of users based in part on at least one of language, location, culture, group, ethnicity, organization, and country. This localization enables at least one trust characteristic of a received message to be expressed with relevant localized visual and/or audio representations for the user or group of user.

At least one embodiment enables a user's locality to be determined based on user supplied information that could be recorded when the user subscribed to a parent message system. In this case, the user would typically have entered at least a messaging address, or some other contact information, from which at least one localization assumption could be made. Alternatively, the parent message system could provide selectable localization options to a user that are independent of the localization assumptions. Also, at least another embodiment can provide postmarks that use generic or universal visual and/or audio representations of trust levels which do not typically require localization.

In one embodiment, the baseline trust level for messages may automatically be determined by the parent message system. The parent system may use criteria specific to the parent message system to determine a baseline assessment of the trust characteristics of a received message. After the initial trust assessment is complete, a postmark is associated with the message. The parent mail system can employ a variety of other systems to determine a trust level, including, but not limited to, anti-spam software, blacklists, green-lists, white-lists, social networks, contacts, user groups, buddy lists, DomainKeys, digital certificates, Public Key Infrastructure (PKI), and the like.

Illustrative Operating Environment

Figure 1:
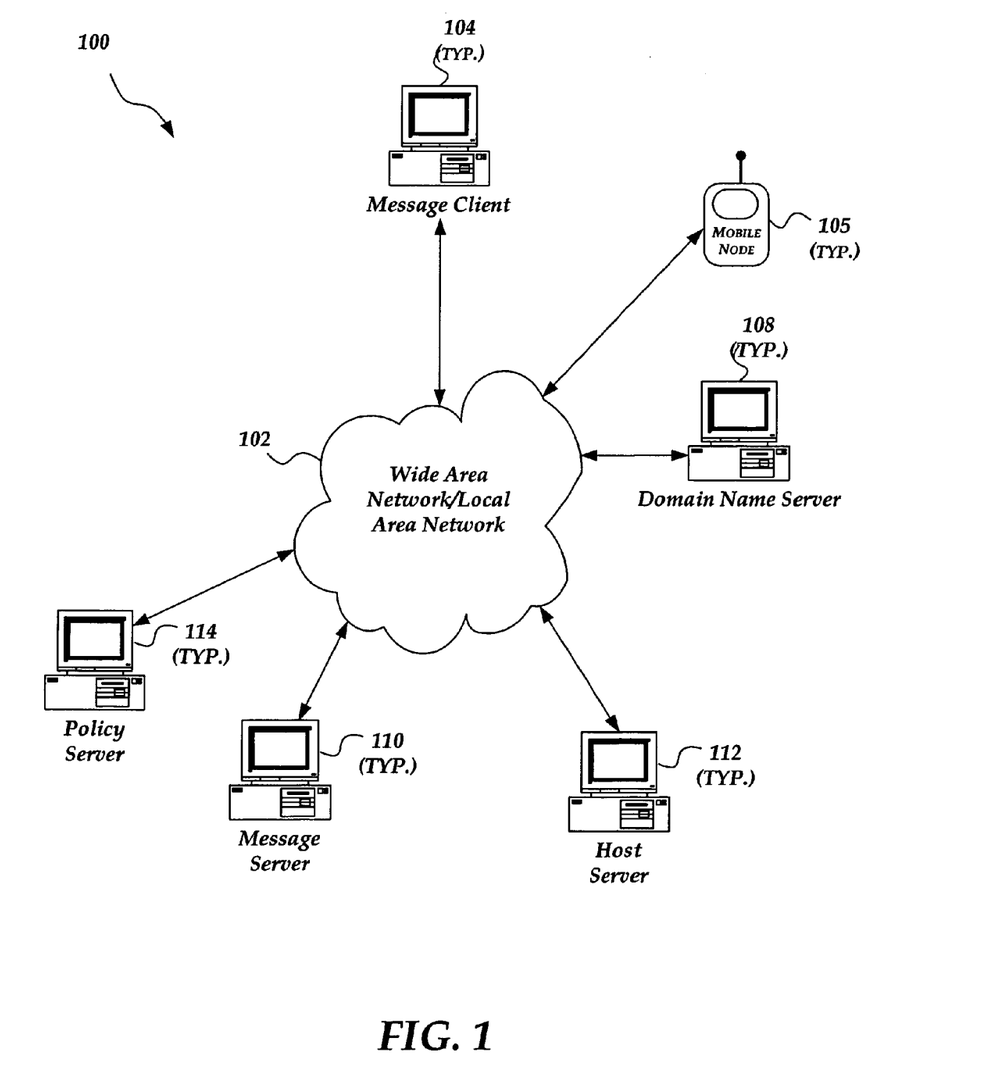
FIG. 1 shows a functional block diagram illustrating one embodiment of an environment for practicing the invention.

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes message clients 104-105, message server 110, policy server 114, host server 112, network 102, and Domain Name System (DNS) server 108. Network 102 enables message clients 104-105 to be in communication with at least one message server 110, one Policy server 114, one host server 112, and at least one DNS server 108.

Generally, message client 104 may include virtually any computing device capable of receiving and sending a message over a network, such as network 102, and the like, to and from another computing device. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, message client 104 also may be any computing device that is capable of connecting using a wired or wireless communication medium such as a PDA, POCKET PC, laptop computer, wearable computer, and any other device that is equipped to communicate over a wired and/or wireless communication medium.

Message client 104 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), eXtensible Markup Language (XML), Dynamic HTML (DHTML), and so forth.

Message client 104 may further include a client application that enables it to perform a variety of other actions, including, communicating a message, such as through a Short Message Service (SMS), Multimedia Message Service (MMS), instant messaging (IM), internet relay chat (IRC), Mardam-Bey's IRC (mIRC), Jabber, email service, and the like, between itself and another computing device. The browser application, and/or another application, such as the client application, a plug-in application, and the like, may enable message client 104 to communicate content to another computing device.

Message clients 104 also may include at least one client application that is configured to receive content from another computing device. The client application may include a capability to provide and receive textual content, graphical content, audio content, and the like.

Mobile client 105 represents one embodiment of a message client that is configured to be portable. Thus, mobile client 105 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile client 105 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, XML, and the like, to display and send a message.

Mobile client 105 also may include at least one client application that is configured to receive content from another computing device. The client application may include a capability to provide and receive textual content, graphical content, audio content, and the like. Mobile client 105 also may be configured to communicate a message, such as through an email, SMS, MMS, IM, IRC, mIRC, Jabber message, and the like, between itself and another computing device. However, the present invention is not limited to these message protocols, and virtually any other message protocol may be employed.

Network 102 is configured to couple one computing device and its components with other computing devices. Network 102 is enabled to employ any form of computer readable media for communicating information from one electronic device to another. Also, network 102 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 102 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, network 102 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 102 may include virtually any wireless and/or wired communication mechanism by which information may travel between computing devices, another network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of policy server 114 is described in more detail below in conjunction with FIG. 11. Briefly, however, policy server 114 may include any computing device capable of connecting to network 102 to manage and classify the trustworthiness of a received message based on a postmark that indicates at least one determined trust characteristic for the received message. The message may be received from any of a variety of sources, including message clients 104-105, host server 112, message server 110, and the like. In one embodiment, policy server 114 employs processes substantially similar to those described in FIGS. 3-4 to manage a received message.

Message server 110 may include virtually any computing device that is configured to receive and send messages to another computing device. In one embodiment, messages are received from one computing device, such as message clients 104-105, and made available to policy server 114 to determine a postmark associated with the message. Message server 110 may then enable an end-user recipient of the message to perform actions on the postmarked message. In another embodiment, message server 110, and/or policy server 114 may perform a default action upon the postmarked message, based in part, on the postmark.

Host server 112 includes virtually any computing device that is configured to provide a resource to another computing device. The resource may include any of a variety of information, including a website, database, FTP data, a blog, graphics, messages, an application, and the like.

DNS server 108 may include virtually any computing device that is configured to operate as a component within a name resolution system that lets users locate computers on a network, such as network 102, by a domain name. In one embodiment, DNS server 108 maintains a database of domain names (host names) and their corresponding IP addresses for use in resolving a domain name into the corresponding IP address.

Devices that may operate as message server 110, policy server 114, DNS server 108, and host server 112 include personal computers desktop computers, multiprocessor systems, microprocessor-based or programmable consumer electronics, network PCs, servers, and the like.

Illustrative Server Environment

Figure 11:
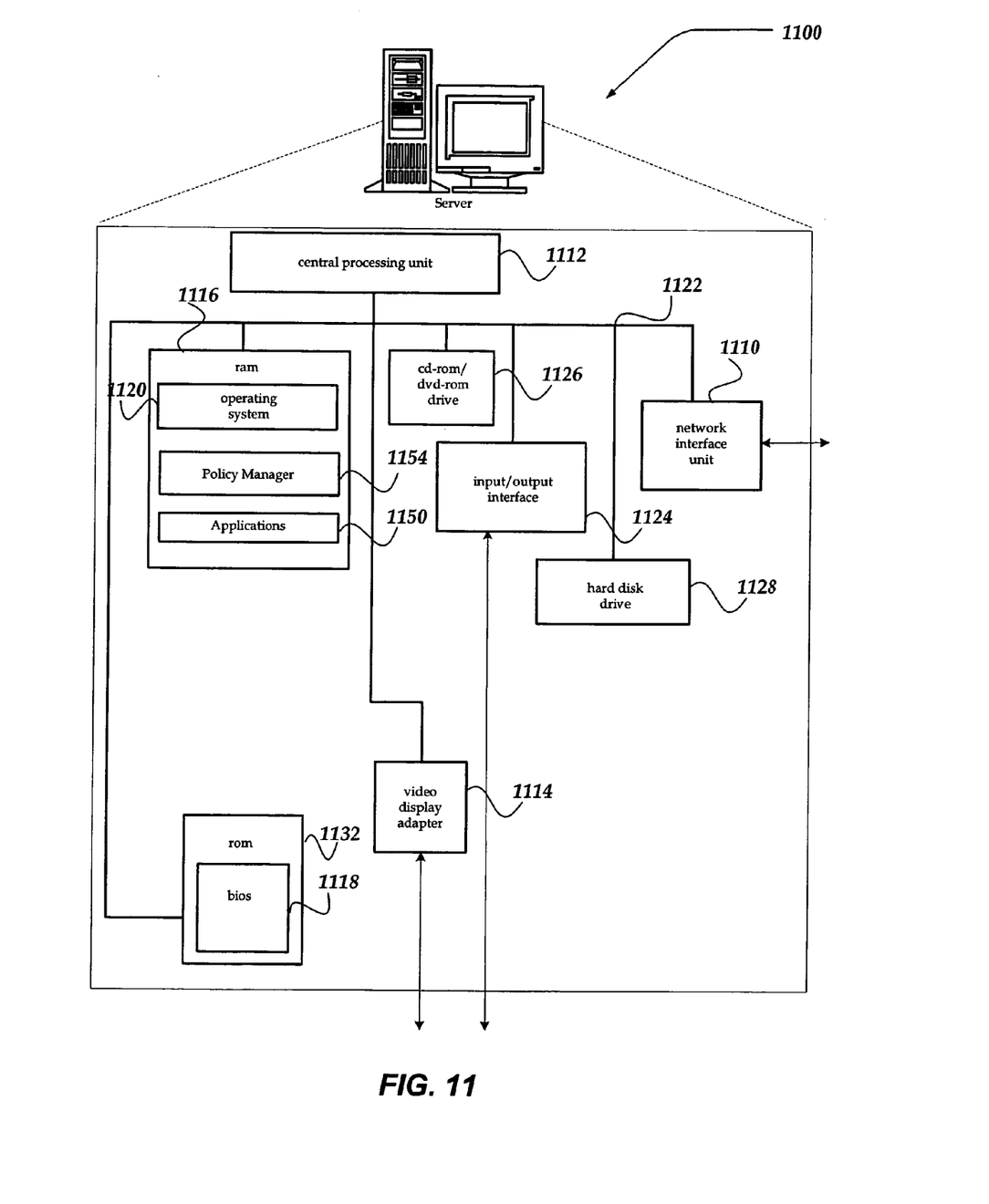
FIG. 11 illustrates one embodiment of a server device for use in managing postmarks for a message, in accordance with the invention.

FIG. 11 shows one embodiment of a server device, according to one embodiment of the invention. Server device 1100 may include many more components than those shown. The components shown, however, are sufficient to disclose an illustrative embodiment for practicing the invention. Server device 1100 may be employed for example as policy server 114 of FIG. 1.

Server device 1100 includes processing unit 1112, video display adapter 1114, and a mass memory, all in communication with each other via bus 1122. The mass memory generally includes RAM 1116, ROM 1132, and one or more permanent mass storage devices, such as hard disk drive 1128, tape drive, optical drive, and/or floppy disk drive. The mass memory stores operating system 1120 for controlling the operation of server device 1100. Any general-purpose operating system may be employed. Basic input/output system ("BIOS") 1118 is also provided for controlling the low-level operation of server device 1100. As illustrated in FIG. 11, server device 1100 also can communicate with the Internet, or some other communications network, such as network 102 in FIG. 1, via network interface unit 1110, which is constructed for use with various communication protocols including the TCP/IP protocol. Network interface unit 1110 is sometimes known as a transceiver, transceiving device, network interface card (NIC), and the like.

Server device 1100 also includes input/output interface 1124 for communicating with external devices, such as a mouse, keyboard, scanner, or other input devices not shown in FIG. 11. Likewise, server device 1100 may further include additional mass storage facilities such as CD-ROM/DVD-ROM drive 1126 and hard disk drive 1128. Hard disk drive 1128 is utilized by server device 1100 to store, among other things, application programs, databases, messages, predefined (default actions) associated with a postmark, a postmark, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 1150 are loaded into mass memory and run on operating system 1120. Examples of application programs include email programs, schedulers, calendars, transcoders, database programs, word processing programs, spreadsheet programs, and so forth. Mass storage may further include applications such as policy manager 1154.

Briefly, policy manager 1154 is configured to manage and classify the trustworthiness of a received message, and to apply a postmark that indicates at least one determined trust characteristic for the received message. The inventive postmark typically displays a visual representation of a trust level along with the received message. The inventive postmark enables a user to quickly review the trustworthiness of received messages without having to open a potentially unsafe/untrusted message. Generally, the postmark is affixed to the received message without user intervention by a relatively automated process performed, at least in part by policy manager 1154. Also, the visual representations of trust levels can include, but are not limited to, graphics, pictures, images, colors, text, symbols, animations, cartoons, movies, clips, and the like. Policy manager 1154 may employ processes described below in conjunction with FIGS. 3-4 to perform at some of its actions.

Postmarks

A postmark is used to convey, at least, the trust level of a sender and/or the contents of the message. At a glance, a visual postmark can indicate at least one of a range of trust levels for at least one of the message's content and the sender. Similarly, an audio postmark can be employed to generate a sound that communicates at least one of a range of trust levels for the sender and/or content of the message.

Figure 2:
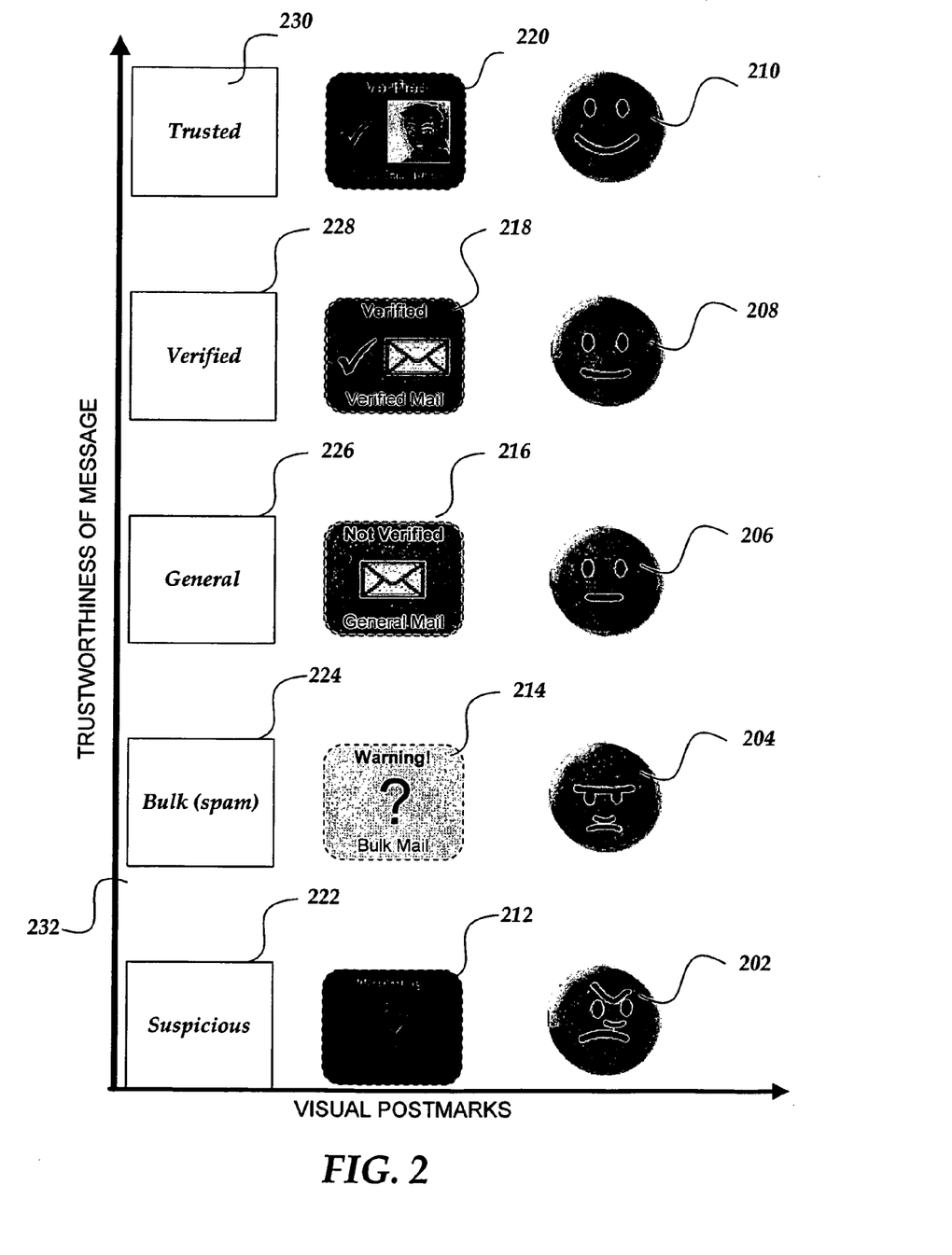
FIG. 2 shows embodiments of visual postmarks.

FIG. 2 illustrates an embodiment of visual postmarks that correspond to various trust levels. The vertical axis 232 represents an increasing level of trust. Recognizable images in the form of postmarks are employed to convey the trust level of the message. A received message determined to have a lower level of trust could be associated with a postmark that visually conveys its untrustworthiness. Similarly, a received message determined to have a higher level of trust could be associated with a postmark that visually conveys its trustworthiness.

Exemplary postmarks, 202, 212, and 222 are shown associated with received messages that are less trustworthy. Postmark 202 illustrates employing an image to visually convey a relatively unsafe trust level. Exemplary postmark 212 employs, at least, text and a graphical symbol to communicate an unsafe trust characteristic. Postmark 222 employs text and/or color to convey an unsafe trust level which can be displayed on a low-resolution display.

As shown, postmarks 202, 204, 206, 208, 210, 212, 214, 216, 218, 220, 222, 224, 226, 228, and 230 convey a range of trust levels for received messages. These postmarks visually represent trust levels that range from relatively untrustworthy messages 202, 212, 222, to more trustworthy messages 210, 220, and 230. Visual representations of trust levels that can be employed with postmarks include, but are not limited to, color, shape, text, borders, pictures, graphics, symbols, images, animations, movies, clips, cartoons, and the like. These visual representations of trust levels can be employed either singly or in combination to indicate the trust level of the sender and/or the content of the message.

Additionally, discrete levels of trust may be, at least, indicated by visual and/or audio postmarks. For example, a "Trusted" level of trust associated with a postmark can be employed to indicate the highest level of trust. In FIG. 2, exemplary visual postmarks 210, 220, and 230 illustrate "Trusted" postmarks. A "Trusted" postmark conveys to the user that the message is highly likely to be safe to open. In one embodiment, for example, a "Trusted" postmark may indicate that the message is from a contact in a user's contact list, green list, or the like.

Also, a "Verified" level of trust could be associated with a postmark to indicate that a message system has verified the source/sender of the message, but not its contents. In one embodiment, a Verified level of trust is also known as "Certified." In particular, the received message's contents could be unsafe (virus, and the like) or include unsolicited offers (spam). Typically, a received message associated with a "Verified" postmark is provided by a sender/source that is known to the message system and most likely trusted. In one embodiment, a "Verified," or "Certified" level of trust may, for example, indicate that message is from a certified bulk sender. Verification or certification of the message sender may include a variety of pre-determined requirements. For example, certification or verification, may include a requirement that the sender is CAN-SPAM compliant, the message includes a working unsubscribe link such as in a message header, includes use of sender authentication technologies such as sender ID, domainkeys, or the like. In another example, a verification or certification requirement may include that the message sender allows for background checks or the like. In FIG. 2, visual postmarks 208, 218, and 228 illustrate "Verified" postmarks.

Furthermore, a "General" level of trust could be associated with a postmark to indicate that a received message includes content that is not spam and/or unsafe, but the sender/source is unknown/untrusted by the message system. In one embodiment, for example, the message may be from a sender that isn't yet trusted or verified (certified), but a spam filter, virus filter, or the like, has not detected the message to be unsafe. In FIG. 2, visual postmarks 206, 216, and 226 are exemplary representations of "General" postmarks.

Additionally, a "Bulk" level of trust could be associated with a postmark to indicate a received message whose content is identified as an unsolicited offer (spam). In FIG. 2, exemplary visual postmarks 204, 214, and 224 illustrate "Bulk" postmarks. "Bulk" postmarks can be employed on messages whose content is identified as spam, and which are received from both untrusted and trusted senders/sources.

Also, a "Suspicious" level of trust could be associated with a postmark to indicate a message whose content has been identified as highly likely to be unsafe such as, computer viruses, Trojan horse software, pornography, phishing attempts, fraudulent offers, internet scams, and the like. A "Suspicious" level of trust may also be known as a "Spam/Fraud" level of trust. In FIG. 2, exemplary postmarks 202, 212, and 222 illustrate "Suspicious" visual postmarks. A "Suspicious" postmark could be employed to indicate that a received message includes unsafe content from either an untrusted and/or trusted sender. In one embodiment of the invention, a "Suspicious" level of trust may also indicate a bulk message that has been determined by more than one spam filter, virus filter, or the like, as including such unsafe content as above (e.g., a two-strikes), and/or indicates a virus/fraud/phishing characteristics, and/or the message in on a signature/URL blacklist, or the like.

Custom Postmarks

A trusted sender/source can customize an image and/or sound for use as the postmark associated with each received message so long as the message's content is not identified as unsafe. The trusted source can provide/select the image and/or sound in advance or at substantially the same time as a message is processed by a message system.

Additionally, a customized postmark can enable a trusted sender to associate a broader concept than just a trust level with a message. For example, a customized postmark associated with a trusted sender could indicate the sender's occupation (engineer, doctor, and carpenter), mood (happy/sad), and/or personal interests (hobbies, sports, travel) in addition to the trust level associated with the sender.

Furthermore, a customized postmark associated with a trusted source such as a business could be arranged to include at least one of a trademark, trade dress, sound, color, picture, graphic, symbol, and the like, that identifies the business in addition to exhibiting a trust level. Also, the customized "business" postmark could be arranged to uniquely indicate a business and/or its type.

In one embodiment, the opportunity to customize a postmark could be provided as a relatively free service to a trusted sender/source. In yet another embodiment, a trusted sender/source would make some form of payment in some manner to sponsor the customization of the postmark associated with its messages that are received by a message system. The amount of this payment could be determined by frequency of use, complexity of the customization, length of time, time of day, time of year (season), type of content included in the message, and the like.

Generalized Operation

Figure 3:
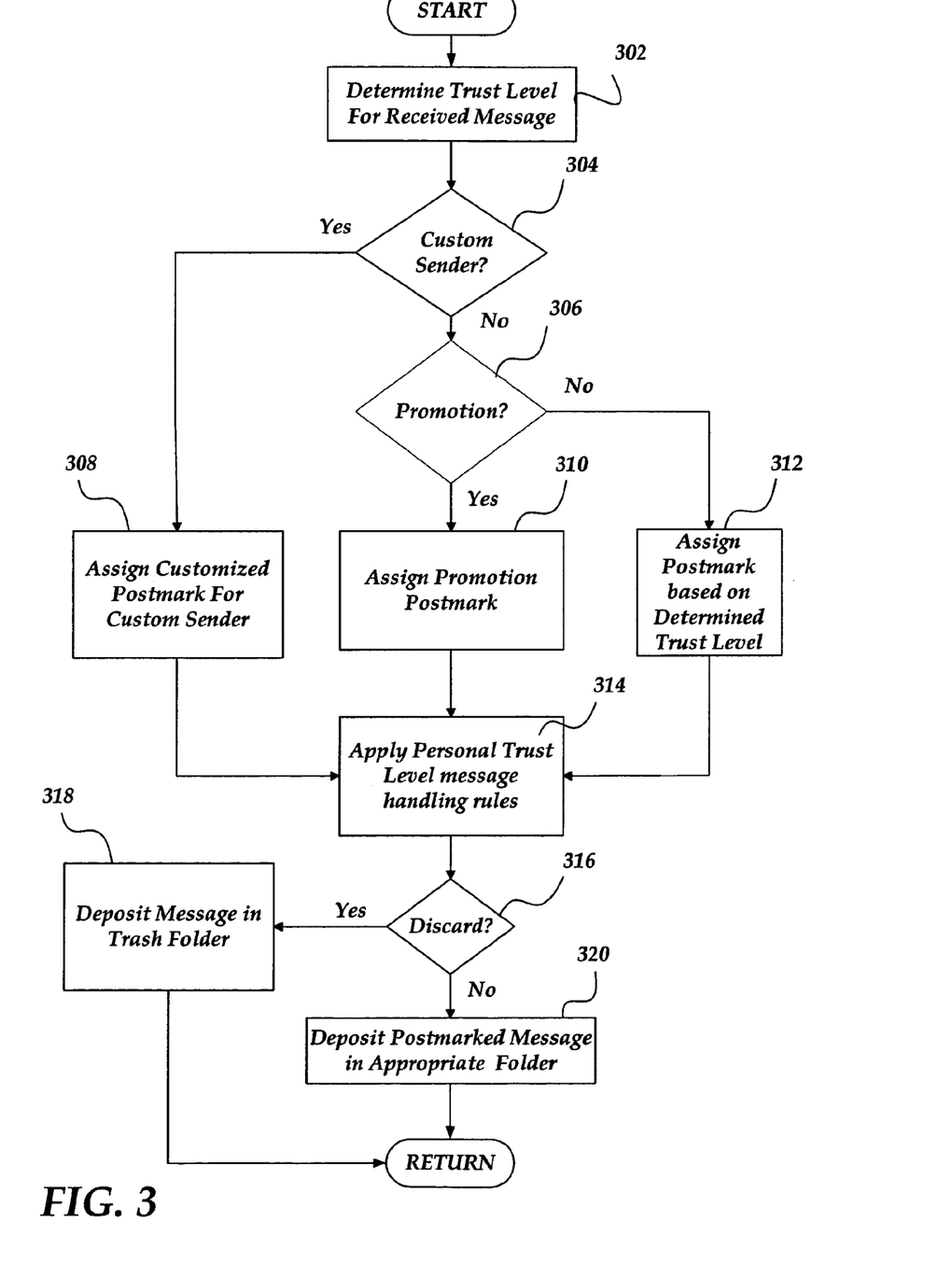
FIG. 3 illustrates a flow chart for one embodiment of a process to postmark a message.

The operation of certain aspects of the invention will now be described with respect to FIGS. 3-4. FIG. 3 illustrates a process where a received message is assigned a postmark. The process of FIG. 3 may be employed, for example, by policy server 114 of FIG. 1.

The process begins, after a start block, at block 302, where a trust level is determined for an external or internal message that arrives at an entry point to a parent message system. An embodiment can employ one or more methods to determine a trust level for a received message, including, but not limited to, anti-spam filters, blacklists, green-lists, white-lists, social networks, contact lists, user group lists, buddy lists, Domain-Keys, and the like. At decision block 304, a determination is made as to whether the message was received from a custom sender, where at least one trust characteristic is pre-selected by the user. If true, the process advances to block 308, where a customized postmark is assigned to the received message. Next, the process steps to block 314, where personalized trust level rules for handling the message are applied. The user's personalized trust level rules can include, but are not limited to, rules that promote the trust level, rules that demote a message's trust level, rules to discard messages of a certain trust level, rules to discard messages from a particular user, and the like.

Alternatively, if the determination at decision block 304 was negative, the process would advance to decision block 306, where another determination would be made whether a promotion is active for the received message such as a sponsored (for pay) postmark, or a particular event such as a holiday. If true, the process advances to block 310 where the promotional and/or sponsored postmark is assigned to the received message. The process flows to block 314 and applies personalized trust level rules for handling the message.

However, if the determination at decision block 306 is negative, the process steps to block 312 where a postmark is assigned to the received message based on the determined trust level. The process subsequently advances to block 314 where the personalized trust level rules for handling the message are applied.

Next, the process advances to decision block 316 where a determination is made as to whether the personalized trust level rules and/or determined trust level indicate that the received message should be discarded by the message system. If true, the process advances to block 318 where the received message is deposited in a "Trash" folder, and the like. The process then returns to performing other actions.

However, if the determination is false at decision block 316, the process steps to block 320 where the postmarked message is deposited into an appropriate folder based on at least one of the personalized trust level rules and/or determined trust level. These folders include, but are not limited to, verified, general, trusted, bulk, and suspicious. Next, the process returns to performing other actions.

In one embodiment, the invention enables a user to employ personalized rules to send an alert when a message of a certain trust level arrives. The implementation for alerting can depend on the features and services provided by the parent message system. One embodiment of alerts enables the sending of a SMS message to the user's mobile device if a message of a designated trust level arrives. Also, an email could be sent if a message of a designated trust level is received.

In another embodiment, personalized rules can be employed to route incoming messages to designated folders or message repositories based on the trust level of the received message. Routing rules enable automatic sorting and organizing of received messages based on their trust level.

Figure 4:
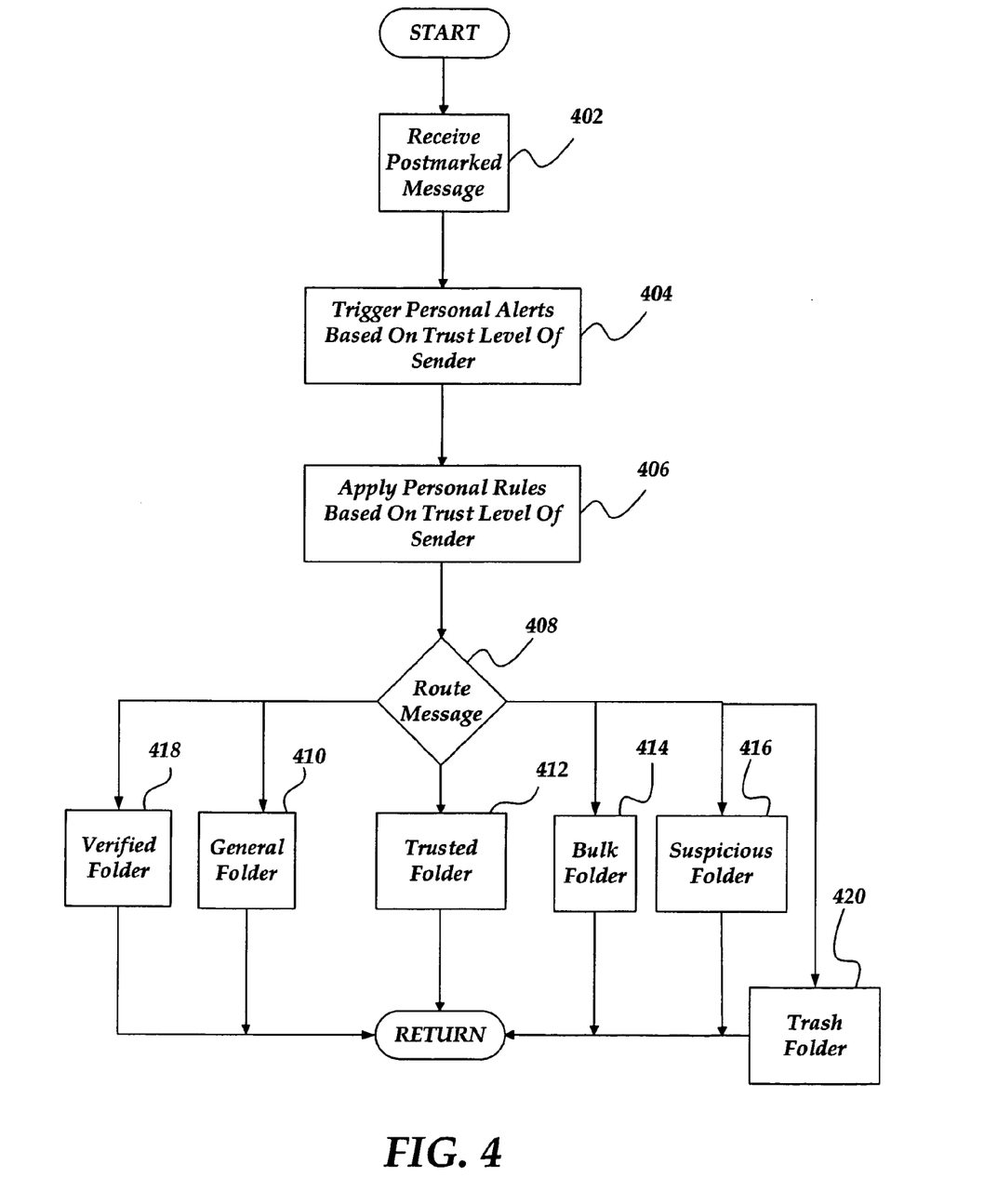
FIG. 4 shows a flow chart for one embodiment of a process to route a postmarked message.

FIG. 4 illustrates further details of the process shown in FIG. 3. Moving from a start block, this process moves to block 402 where a postmarked message is received. Moving to block 404, personalized alerts based on the determined trust level of the postmarked message are triggered. Stepping to block 406, personalized rules are applied to the postmarked message such as triggering at least one personalized alert based on customized, promotional and/or sponsored postmarks. These rules can also include routing information that is employed to determine a folder for the received message.

At block 408, the received message is delivered to at least, one folder, including, but not limited to, general 410, trusted 412, bulk 414, suspicious 416, verified 418, and trash 420. Next, the process returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Postmark Assignment

Figure 5A:
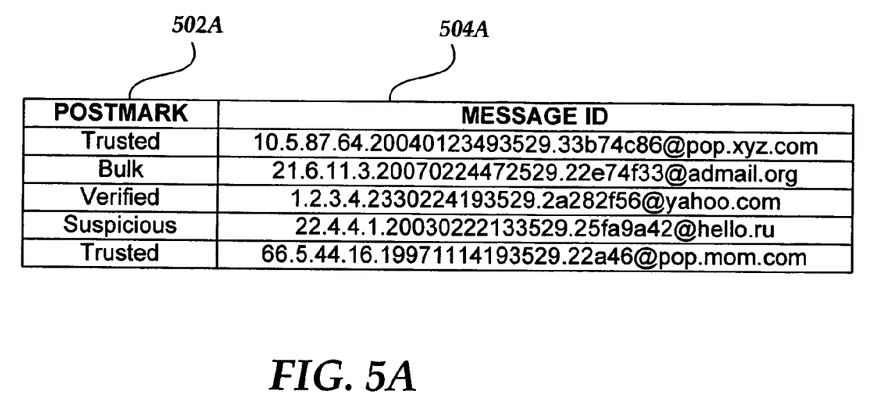
FIGS. 5A and 5B illustrate assigning postmarks to messages.

The invention enables a trust level to be assigned to an incoming message, based on criteria established by at least the parent messaging system. FIG. 5A illustrates one embodiment for assigning trust levels to messages. In this embodiment, trust level postmarks 502A can be assigned to messages using exemplary message identification numbers 504A of a type that is typical for electronic mail (email). Typically, the assignment of a trust level and a postmark to an individual message is stored in different fields and/or records of a database. However, in another embodiment, the trust level and/or postmark may be inserted within the message itself.

Figure 5B:
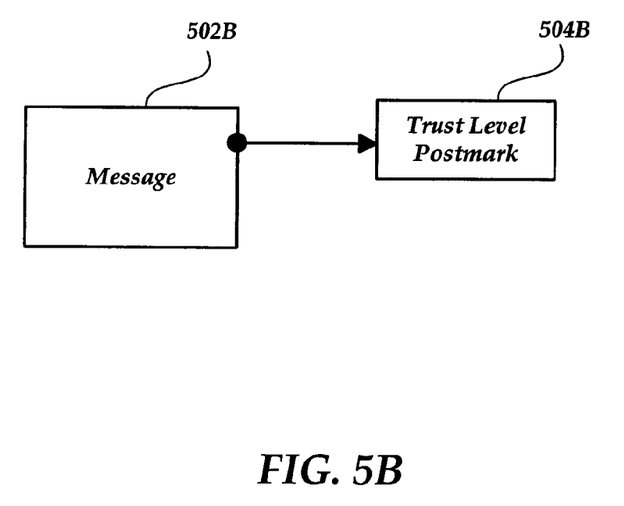

FIG. 5B illustrates another embodiment that can be employed to assign a trust level postmark 504B to a message 502B. In this embodiment, an identifier is generated that corresponds to postmark 504B. This identifier can be inserted into or appended to message 502B. The identifier can also be stored in a database to enable the trust level postmark to be retrieved.

The invention enables users to configure and assign message handling rules to trust levels. The available rules can depend in part on services provided by a parent messaging system. In one embodiment, users can assign rules that, at least, organize, filter, discard, and sort incoming messages based on trust level. In another embodiment, users can choose from rules supplied by the parent message system and assign them to designated trust levels. In still another embodiment, users can construct rules composed of rule clauses and subparts supplied by the parent message system.

Illustrative Actions/Rules Associated With a Postmark

Each postmark may include two elements associated with it: a class-specific icon/graphic/audio or the like, and a button/pull-down or the like for executing a rule, on the message associated with the postmark. For example, in one embodiment, a certified/verified message may include a graphic that indicates the message as certified/verified, as described above. The certified/verified message may also include a button/pull-down or similar action or rule selector that allows a user to unsubscribe directly from the postmark. Moreover, such action or rule selectors may be available for use independent of how the message is provided to user, including mail list views, message views, or so forth. Virtually any action or rule may be assigned to a postmark, and the following illustrate only a couple of possible actions, and is not intended to limit the invention in scope or spirit.

Thus, as an example, because a "Trusted" message may be from a contact already in the recipient's address book, contact list, or the like, a possible corresponding action may include providing an online status of the contact, removing a contact and/block contact from a list, and the like.

A possible action or rule associated with "Certified," or Verified messages might allow the user/recipient to unsubscribe to a mailing list associated with the message, or the like.

A possible corresponding action or rule that may be associated with a "General" message might include allowing the user/recipient to add the sender to an address book, contact list, or the like.

Because certain criteria may improperly trigger a message as a "Bulk" message, a possible corresponding action or rule might allow the user/recipient to specify the message as NOT spam, or the like. Suspicious messages (spam/fraud messages), may include a corresponding action or rule that allows the user to block future messages from the sender.

Moreover, a variety of default actions or rules may be assigned to a trust level. For example, a "Trusted" message may include a default rule/action indicating that the message is to be accepted and a default folder is an 'inbox' folder. Similarly, a "Certified," or "Verified" message might be defaulted to be accepted and sent to a default folder such as the "inbox' folder. A "General" message might be accepted and sent to the 'inbox' as a default rule/action. A "Bulk" message might be accepted and sent to a "Bulk" folder, while a "Suspicious" or "Spam/Fraud" message might not be accepted.

Figure 6:
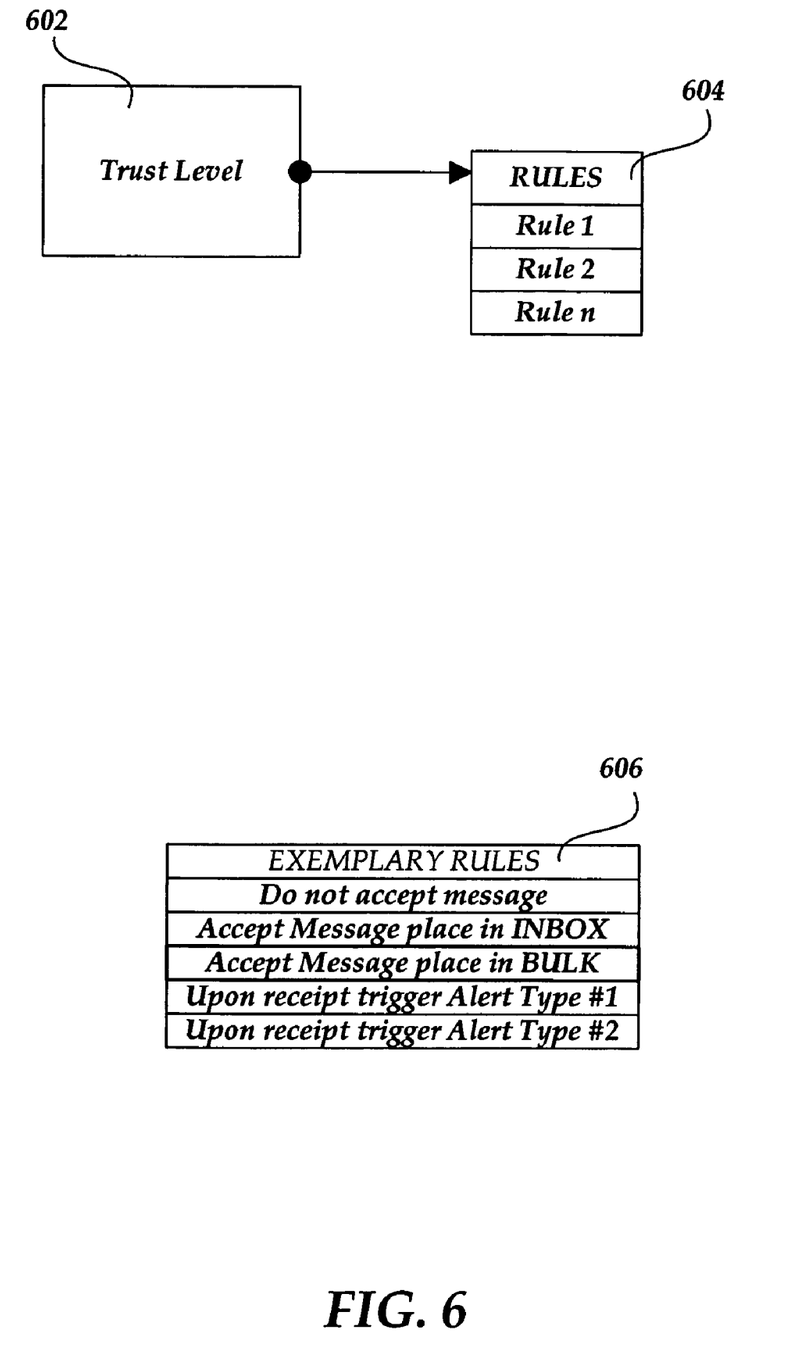
FIG. 6 shows one embodiment of an association of personalized message handling rules to trust levels.

However, the invention enables the user to generate virtually any rules/actions to be associated with a postmark. For example, FIG. 6 illustrates one embodiment that can be employed to assign rules to trust levels.

Block 602 represents a trust level supplied by a parent messaging system. In one embodiment, the trust level could be, at least, one of the following: "Trusted", "Verified", "General", "Bulk", and "Suspicious." Block 604 represents a set of message handling rules that either singly, or in combination, operate on a received message that is assigned to trust level 602. In one embodiment, an SQL database table can be employed to record the assignment using a unique key comprised of the user's unique message system identifier and an identifier for the trust level. In yet another embodiment, an XML data-structure can be employed to store the rule assignments. The XML data-structure could be recorded in the user's "user-preferences" table. Block 606 is an exemplary table showing rules that may be assigned to trust levels such as shown in block 604.

Illustrative User-Interface

Visual postmarks enable users to be visually informed of the trust characteristics of messages without special training. The visual postmarks may be employed as part of the user-interfaces of messaging systems without requiring major changes to the appearance or behavior of message viewing applications. One embodiment enables visual postmarks to be displayed in an email folder view, sometimes described as a message inbox. The invention can be employed to display visual postmarks in a column near the message sender and message subject columns.

Figure 7A:
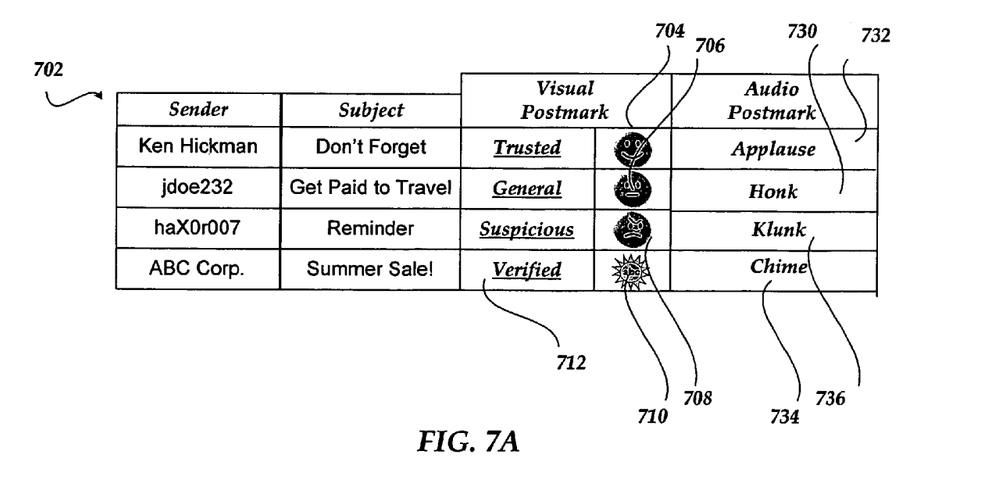
FIG. 7A illustrates an embodiment of a user-interface.
Figure 7B:
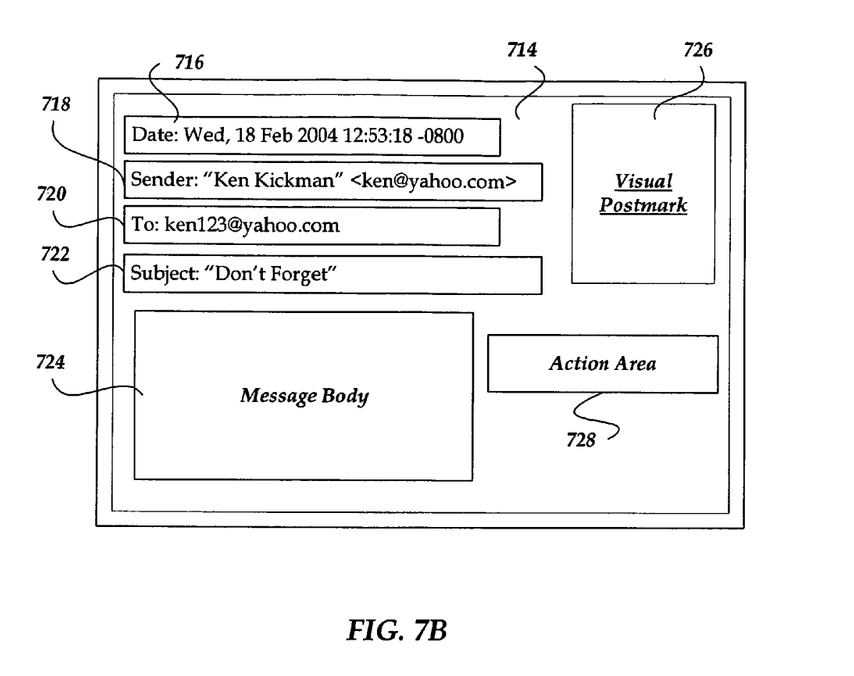
FIG. 7B illustrates an embodiment of a user-interface for assigning visual and audio postmarks to different trust levels.

FIG. 7A illustrates a user-interface that employs visual postmarks. Table 702 represents an embodiment of a user's message system "inbox." The inbox may show a variety of fields, including, but not limited to, sender's name, message subject, message received date, message delivery date, message size, graphical postmark, and the like. Visual postmark 704 visually indicates that the corresponding message has been classified as "Trusted." Visual postmark 706 visually indicates that the corresponding message has been classified as "General." Visual postmark 708 visually indicates that the corresponding message has been classified as "Suspicious." Finally, visual postmark 710 visually indicates that the corresponding message has been classified as both "Verified" and associated with a sponsored postmark. Additionally, column 712 also includes optional text that further identifies the message trust levels for the corresponding received messages.

Furthermore, optional audio postmarks are shown assigned to received messages. These audio postmarks may be played once when each message is received and/or periodically until the received message is opened. In this exemplary embodiment, "Applause" sound 732 is associated with a "Trusted" message, "Honk" sound 730 is associated with a "General" message, "Klunk" sound 736 is associated with a "Suspicious" message, and "Chime" sound 734 is associated with a "Verified message.

From message inbox list 702, a user can choose a message to open such as selecting a message inbox row. The actual format and presentation of opened message may vary depending on the type of program and device used to view the message. The methods that may be employed by embodiments to enable selection include, but, are not limited to, computer mice, track-balls, buttons, keystrokes, arrow-keys, touch screens, voice commands, pointing devices, remote-controls, user eye-tracking, and the like.

Block 714 represents a message that has been opened. Data and information appropriate for the message may be displayed. One embodiment, at least, includes the date the message was received 716, the name and messaging system address of the message sender 718, the name and messaging system address of the message recipient 720, the message subject line 722, and the message body 724. Additionally, the invention enables the display of visual postmark 726 and as associated action area 728. One embodiment can render the visual postmark on a printed version of the message. This enables a reader to be apprised of the message trust level even though the message is being read offline. In one embodiment, additional information regarding the message trust level can be displayed by selecting the visual postmark displayed in the message inbox list 704; or by selecting the visual postmark shown on the opened message 726. Selecting a visual postmark may open a new window that will provide extended information about the visual postmark and its associated trust level. Moreover, action area 728 enables the user to select one or more actions, rules, or the like to perform upon the message, as described above. In one embodiment, action area 728 may be activated using a javascript, DHTML, a script, a link, a pull-down, and the like.

In addition to enabling visual communication of trust levels, visual postmarks may be employed as a facility for assembling and accessing other information, including, but not limited to, message sender details, message system details, description of how the trust level was determined, detailed description of the trust level, sponsored partners, sponsored promotional information, message system promotional information, access to additional message system services and facilities, and the like. The visual postmark extended information window may enable the user access a variety of message system facilities, including, but not limited to, messaging address books, spam reporting, sender blocking lists, buddy lists, instant messaging, email, message system FAQ's, message system online help, message system tutorials, and the like.

Figure 8:
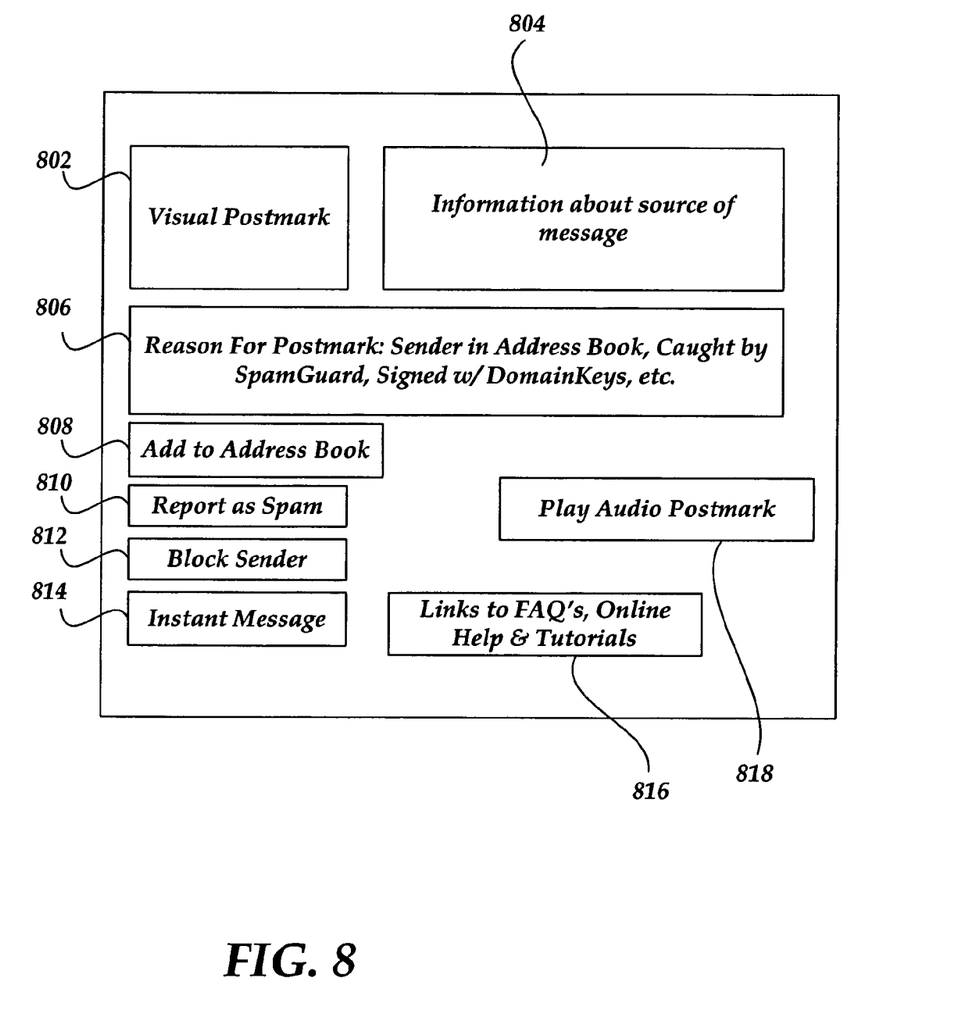
FIG. 8 shows an embodiment of a postmark extended information window.

FIG. 8 represents one embodiment of a visual postmark extended information window. This user-interface component displays a variety of detail and collateral information that may be of interest to the user. In one embodiment, visual postmark 802 may be displayed. Block 804 may contain information related to the source of message. If the message is from a sponsored partner, block 804 may be employed to display information particular to the sponsored partner, including, but not limited to, company logos, trademarks, links to the sponsored partners website(s), information regarding a particular promotion, "catch phrases", and the like.

If the message is from a non-commercial sender, block 804 may be employed to display the sender's profile information, including, but not limited to, name, primary and alternative mailing addresses, primary and alternative message system addresses, phone numbers, instant message handles, personal avatars, nick-names, buddies, friends, favorite websites, physical description, photographs, sender's website, and the like.

Block 806 may be employed to describe how or why the message has been assigned a particular visual postmark. In one embodiment, if the message has been assigned the "Bulk" visual postmark, which may indicate the message is spam; block 806 may describe the reasoning behind why the message system considers this message to be spam. An embodiment, may provide access to a variety of functions and features, including, but not limited to, add sender to address book 808, report message as spam 810, discard all messages from this sender in the future 812, initiate an instant message session with sender 814, a collection of links to other message system facilities 816, and the like.

In one embodiment, the user can access the visual postmark extended information window without opening the associated message. The invention enables the visual postmark extended information to be accessed by directly selecting the visual postmark as displayed in the message inbox view. In this embodiment, the visual postmark extended information window can be opened without opening the corresponding message. Accordingly, the user can examine the visual postmark extended information without exposure to the potentially unsafe message. A user may employ the visual postmark extended information of a message to decide whether to open the message, not withstanding the trust level of the message. For example, a message, from a familiar sender, marked as "Suspicious" can be safely reviewed without opening it.

The invention enables the user to override the message trust level assigned by the parent message system. This enables the user to have greater control over how incoming messages are handled. An embodiment of the invention may employ this feature by allowing the user to assign a trust level to individual senders that are in the user's messaging address book. Another embodiment allows the user to assign a personalized trust level to the sender directly from the incoming message user-interface ("inbox") without requiring the sender to be added, or included in the address book. In addition, the present invention enables users to add persons to his or her trusted list from a variety of message sources, including, but not limited to, instant messaging, e-mail, IMAP servers, LDAP servers, POP3 servers, short message service centers (SMSC), and the like.

Figure 9:
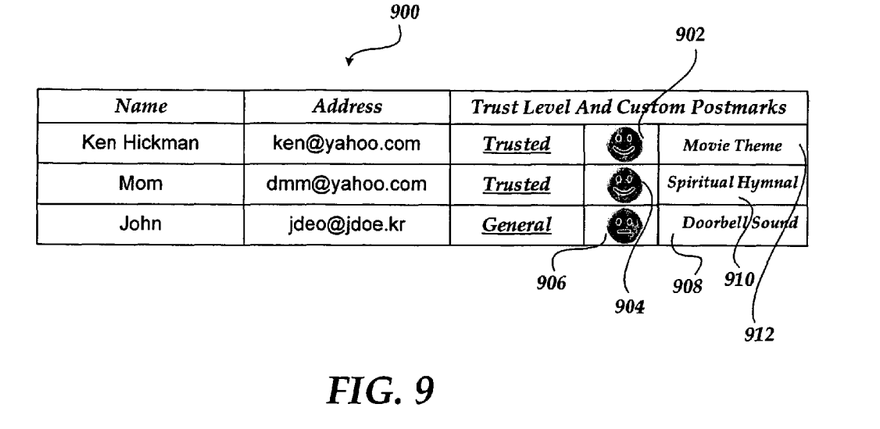
FIG. 9 illustrates one embodiment of a customized assignment of trust levels and postmarks.

FIG. 9 illustrates an embodiment that can be employed to assign customized trust levels to individual senders. Table 900 represents a message system address book, or other similar kind of collection, containing a list of senders. Rows 902 and 904 represent senders that the user has promoted from a "General" trust level to a "Trusted" trust level. In this configuration, messages received from the row 902, and row 904 senders can automatically be promoted to a trust level of "Trusted" and be processed accordingly. Row 906 illustrates a sender that has not been selected for promotion.

Additionally, optional audio postmarks can be separately customized for individual senders. For example, "Movie Theme" sound 912 can be assigned to "Ken Hickman," "Spiritual Hymnal" sound 910 can be assigned to "Mom," and "Doorbell" sound 908 can be assigned to "John."

The present invention enables message system providers to employ graphical postmarks that express the identity of their commercial partner's. This type of graphical postmark can visually communicate that the message is from a particular commercial partner. Graphical postmarks can be employed to express the commercial partner's identity in a variety of ways, including, but not limited to, registered trademarks, trade dress, logos, graphical images, color, shapes, text, lettering, and the like.

The present invention also enables the message system provider to assign graphical postmarks to its commercial partners for use in special promotions. The commercial partner can employ specialized graphical postmarks to represent a variety of special promotions, including, but not limited to, seasonal sales, one-time sales, coupons, announcements, birthday messages, contests, invitations, and the like.

Accordingly, the invention enables the commercial partner and the message system provider to establish mutually beneficial relationships. In one embodiment, a commercial partner may be enabled to present their identity to the user before the message is opened because the commercial partner's graphical postmark is visible in the user's message inbox list. The message system provider benefits from the relationship because the commercial partner can be charged a fee in exchange for being allowed to use a specialized graphical postmark.

Figure 10:
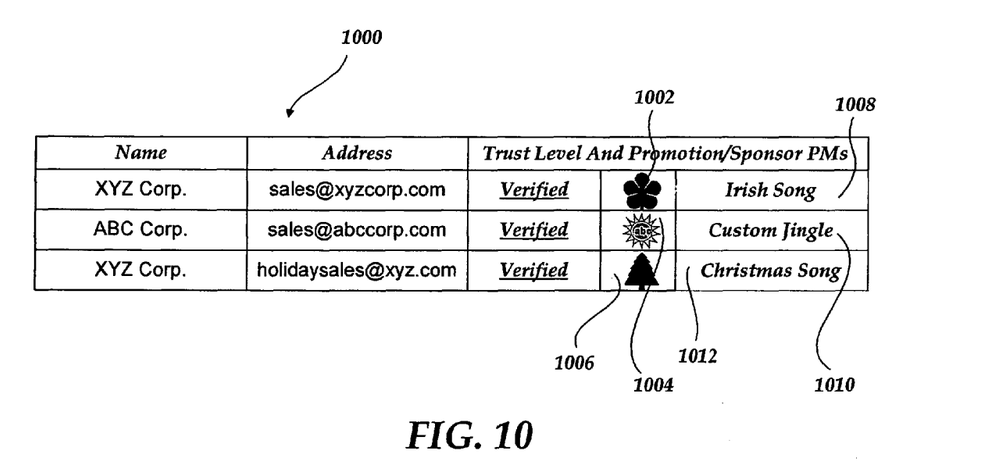
FIG. 10 shows an embodiment showing promotional and sponsored postmarks.

FIG. 10 illustrates an embodiment where sponsors and promotions are employed to assign customized visual and audio postmarks. Table 1000 includes, at least, commercial sponsors. Visual postmarks 1002 and 1004 represent logos from two different commercial sponsors. These visual postmarks can correspond to the commercial sponsor's trademark, brand and/or logo. Visual postmark 1006 represents the same commercial sponsor as assigned to visual postmark 1002, except that postmark 1006 corresponds to a promotion offered over the Christmas holiday. This promotional postmark visually communicates that the received message is associated with a particular promotion by a commercial sponsor.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for indicating a trust level for a message, comprising:
    determining a trust characteristic for a received message;
    associating a postmark for the determined trust characteristic with the received message;
    enabling a display of the postmark along with at least an indication of an unopened representation of the received message, wherein the trust characteristic of the received message is visually determinable by a user before the received message is opened based on the displayed postmark, and wherein the postmark is further displayed with one or more action selectors that enable one or more actions that are assigned to the postmark for handling the received message, based at least on the trust characteristic;
    enabling the user to select at least one of the action selectors to execute at least one rule for handling the received message based, in part, on the postmark, wherein the at least one rule is selectable by the user as a default for handling future received messages with the same postmark; and
    wherein the postmark is a customized postmark for a particular sender if the received message is from the particular sender, and wherein the customized postmark is a promotional postmark for at least one promotion if the at least one promotion is active for the received message.

2. The method of claim 1, wherein the postmark includes at least one of a graphic, image, picture, color, text, symbol, animation, cartoon, audio signal, or a movie.

3. The method of claim 1, wherein determining the trust characteristic further comprises employing at least one of anti-spam detection, black lists, green lists, white lists, social networks, contacts, user groups, buddy lists, or DomainKeys.

4. The method of claim 1, wherein the trust characteristic includes at least one of a Trusted level that indicates a sender of the received message is safe and content of the received message is safe, a Verified level that indicates a sender of the received message is safe, a General level that indicates that content of the received message is safe, a Bulk level that indicates that content of the received message is spam, or a Suspicious level that indicates that content of the received message is unsafe.

5. The method of claim 1, wherein the postmark is customizable by at least one of a user for a particular sender of the received message or a sponsor that is at least a verifiable sender of the received message.

6. The method of claim 1, wherein the at least one rule for handling the received message is further based a sender of the received message.

7. The method of claim 1, wherein the at least one rule provides for at least one of demoting the trust characteristic, increasing the trust characteristic, discarding the received message based on the sender, and discarding the received message based on the trust characteristic.

8. The method of claim 1, wherein the at least one rule is selectable based on at least one of an action button or a pull-down menu.

9. The method of claim 1, wherein the at least one rule provides for routing the received message to at least one folder.

10. The method of claim 1, further comprising providing at least one alert based on at least one of the trust characteristic and a sender of the received message.

11. The method of claim 10, wherein the at least one alert includes at least one of an Instant Message (IM), Short Message Service (SMS), and electronic mail (email).

12. A mobile device for representing a trust level for a message, comprising:
    a memory for storing instructions; and
    a processor for performing actions based at least in part on the stored instructions, including:
    determining a trust characteristic for a received message;
    associating a postmark for the determined trust characteristic with the received message;
    enabling a display of the postmark along with at least an indication of an unopened representation of the received message, wherein the trust characteristic of the received message is visually determinable by a user before the received message is opened based on the postmark, wherein the postmark is further displayed with one or more action selectors that enable one or more actions that are assigned to the postmark for handling the received message, based at least on the trust characteristic, and wherein each of the one or more actions is selectable by the user as a default for handling future received messages with the same postmark; and
    wherein the postmark is a customized postmark for a particular sender if the received message is from the particular sender, and wherein the customized postmark is a promotional postmark for at least one promotion if the at least one promotion is active for the received message.

13. The mobile device of claim 12, wherein the postmark is displayable prior to the opening of the received message.

14. The mobile device of claim 12, wherein the trust characteristic is associated with at least one of the received message's content and a sender of the received message.

15. The mobile device of claim 12, wherein the postmark is localized to at least one of a user's language, location, culture, group, ethnicity, organization, or country.

16. The mobile device of claim 12, wherein determining the trust characteristic further comprises employing at least one of anti-spam detection, black lists, green lists, white lists, social networks, contacts, user groups, buddy lists, and DomainKeys.

17. The mobile device of claim 12, wherein the postmark is customizable in view of a promotion that includes at least one of a holiday, season, coupon, contest, announcement, location, sporting event, festival, historical event, or birthday.

18. A server for representing a trust level for a message, comprising:
    a memory for storing instructions; and
    a processor for performing actions based at least in part on the stored instructions, including:

determining a trust characteristic for a received message;

associating a postmark for the determined trust characteristic with the received message;

enabling a display of the postmark along with at least an indication of an unopened representation of the received message, wherein the trust characteristic of the received message is visually determinable by a user before the received message is opened based on the postmark, wherein the postmark is further displayed with one or more action selectors that enable one or more actions that are assigned to the postmark for handling the received message, based at least on the trust characteristic, and wherein each of the one or more actions is selectable by the user as a default for handling future received messages with the same postmark; and wherein the postmark is a customized postmark for a particular sender if the received message is from the particular sender, and wherein the customized postmark is a promotional postmark for at least one promotion if the at least one promotion is active for the received message.

19. The server of claim 18, wherein the trust characteristic includes at least one of a Trusted level that indicates a sender of the received message is safe and content of the received message is safe, a Verified level that indicates a sender of the received message is safe, a General level that indicates that content of the received message is safe, a Bulk level that indicates that content of the received message is spam, and a Suspicious level that indicates that content of the received message is unsafe.

20. The server of claim 18, further comprising enabling a user to select at least one rule for handling the received message that is based on at least one of the determined trust characteristic and a sender of the received message.

21. The server of claim 18, further comprising providing at least one alert based on at least one of the trust characteristic and a sender of the received message.

22. A non-transitory computer-readable storage medium, comprising executable instructions for performing actions, including:

determining a trust characteristic for a received message;

associating a visual representation of a postmark for the determined trust characteristic with the received message;

enabling a display of the visual representation of the postmark along with at least an indication of an unopened representation of the received message, wherein the trust characteristic of the received message is visually determinable by a user before the received message is opened based on the visual representation of the postmark, wherein the visual representation of the postmark is further displayed with one or more action selectors that enable one or more actions that are assigned to the visual representation of the postmark for handling the received message, based at least on the trust characteristic, and wherein each of the one or more actions is selectable by the user as a default for handling future received messages with the same visual representation; and wherein the postmark is a customized postmark for a particular sender if the received message is from the particular sender, and wherein the customized postmark is a promotional postmark for at least one promotion if the at least one promotion is active for the received message.

23. The computer-readable storage medium of claim 22, wherein the visual representation is a postmark.

24. A system for managing a trust level for a message over a network, comprising:

a server to perform actions, including determining a trust characteristic for a received message;

associating a postmark for the determined trust characteristic with the received message; and a client to perform actions, including:

displaying the postmark along with at least an indication of an unopened representation of the received message, wherein the trust characteristic of the received message is visually determinable by a user before the received message is opened based on the postmark, wherein the postmark is further displayed with one or more action selectors that enable one or more actions that are assigned to the postmark for handling the received message, based at least on the trust characteristic, and wherein each of the one or more actions is selectable by the user as a default for handling future received messages with the same postmark; and wherein the postmark is a customized postmark for a particular sender if the received message is from the particular sender, and wherein the customized postmark is a promotional postmark for at least one promotion if the at least one promotion is active for the received message.

* * * * *